(12) United States Patent
Hays

(10) Patent No.: US 6,865,578 B2
(45) Date of Patent: Mar. 8, 2005

(54) METHOD AND APPARATUS FOR THE DESIGN AND ANALYSIS OF MARKET RESEARCH STUDIES

(76) Inventor: Wesley Joseph Hays, 2915 NE. 182nd St., Lake Forest Park, WA (US) 98155

( * ) Notice: Subject to any disclaimer, the term of this patent is extended or adjusted under 35 U.S.C. 154(b) by 541 days.

(21) Appl. No.: 09/946,123

(22) Filed: Sep. 4, 2001

(65) Prior Publication Data

US 2003/0050928 A1 Mar. 13, 2003

(51) Int. Cl.⁷ .............................................. G06F 17/30
(52) U.S. Cl. ................................................... 707/102
(58) Field of Search ....................... 707/102, 6, 104.1; 705/10

(56) References Cited

U.S. PATENT DOCUMENTS

| | | | | |
|---|---|---|---|---|
| 4,006,737 | A | * | 2/1977 | Cherry ........................ 600/515 |
| 4,355,372 | A | * | 10/1982 | Johnson et al. ........... 379/92.04 |
| 4,688,195 | A | * | 8/1987 | Thompson et al. ............ 706/11 |
| 4,839,822 | A | * | 6/1989 | Dormond et al. ............. 706/45 |
| 5,594,638 | A | * | 1/1997 | Iliff ................................ 705/3 |
| 5,832,504 | A | * | 11/1998 | Tripathi et al. ............. 715/526 |
| 6,078,891 | A | * | 6/2000 | Riordan et al. .............. 705/10 |
| 6,098,048 | A | * | 8/2000 | Dashefsky et al. ........... 705/10 |
| 6,131,085 | A | * | 10/2000 | Rossides ........................ 705/1 |
| 6,154,739 | A | * | 11/2000 | Wrobel .......................... 707/6 |
| 6,189,029 | B1 | * | 2/2001 | Fuerst ........................ 709/217 |
| 6,236,975 | B1 | * | 5/2001 | Boe et al. ...................... 705/7 |
| 6,356,909 | B1 | * | 3/2002 | Spencer ...................... 707/10 |
| 6,374,261 | B1 | * | 4/2002 | Alvarez et al. ............. 707/200 |
| 6,510,430 | B1 | * | 1/2003 | Oberwager et al. .......... 707/10 |
| 2001/0056398 | A1 | * | 12/2001 | Scheirer ...................... 705/38 |
| 2002/0073005 | A1 | * | 6/2002 | Welnicki et al. ............. 705/35 |
| 2002/0077882 | A1 | * | 6/2002 | Nishikawa et al. .......... 705/10 |
| 2002/0099591 | A1 | * | 7/2002 | Dyer ........................... 705/10 |
| 2002/0138284 | A1 | * | 9/2002 | DeColitis et al. ............. 705/1 |
| 2003/0023685 | A1 | * | 1/2003 | Cousins et al. ............. 709/205 |
| 2003/0050814 | A1 | * | 3/2003 | Stoneking et al. ............. 705/7 |

OTHER PUBLICATIONS

Gilbert A. Churchill, Jr., Marketing Research Methodological Foundations, Sixth Edition, 1995, selected pages from 397–1106, The Dryden Press, Orlando, Fort Worth.

Selected pp. from Churchill, above: pp. 397, 439–440, 455, 480, 735–745, 755, 771–772, 804, 813, 826, 851, 1080–1094, 1104–1106.

James T. McClave and P. George Benson, Statistics for Business and Economics, 6th Edition, 1994, pp. 362, 393, 434, 435, 974, 1125, 1127, 1138–9, Dellen–MacMillan, New York.

(List continued on next page.)

*Primary Examiner*—Wayne Amsbury

(57) ABSTRACT

This invention automates the most common processes in market research study design and analysis. By combining a database framework designed to hold all the data elements used in a market research survey, codifying heuristics actually used by analysts to make decisions about survey analysis, and building a lexicon to communicate summary results to lay readers. First, this provides a stringent framework for designing a questionnaire and study plan which will lead to clear tab plans and analysis plans. Second, by automating the research design and analysis process, it eliminates the human error associated with the intricacies of questionnaire design, tab plan design, and research report writing. Thirdly, it also greatly reduces the time necessary to rerun an entire report based on simple changes to any study element definitions to a few hours, a process formerly taking days or weeks. Lastly, it reduces the need for experienced researchers in the research design and analysis process, freeing analysts to spend a greater proportion of their time working on the more mentally challenging and demanding work of synthesizing the market research survey to produce credible findings, rather than the redundant work of data tabulation and summary reporting.

4 Claims, 10 Drawing Sheets

Flowchart depicting the new research design flow using the present invention.

OTHER PUBLICATIONS

Elizabeth Castro, HTML for the World Wide Web, 1989, pp. 177–178, Peachpit Press, Berkeley, USA.

Elizabeth Castro, PERL and CGI for the World Wide Web, 1999, pp. 44–45, 223, Peachpit Press, Berkeley, USA.

Harvard Graphics, Harvard Graphics 98, pp. 1–3, Title Date Unknown, www.harvardgraphics.com Web site, Hudson.

Microsoft Corporation, Microsoft Visual Basic Professional Edition Version 6.0 End User License, Microsoft, p. 1, 1999. Redmond.

Sawtooth Software, Ci3 Computer Interviewing, www.sawtoothsoftware.com, pp. 1–2, Title Date Unknown, Sequim.

Marketing Masters, Survey Said 1999 Reference Manual, www.surveysaid.com/marketing_masters, pp. 1–2, 2001, De Pere.

Survey Tracker, Fast Tracks, www.surveytracker.com, pp. 1–6, 2001, Lebanon.

Raosoft, Inc., New Features in EZSurvey 2000 for the Internet!, 2000, pp. 1–2, Raosoft, Seattle.

Marketing Research Association, Glossary of Terms, 2002, p. 29, www.mra-net.org, Rocky Hill.

Raymond Hastings, ESOMAR Marketing Research Glossary, 2001, pp. 1, 26, 30, ESOMAR, Amsterdam, The Netherlands.

International Market Research Information, Glossary of Market Research Terms, pp. 1, 92, 103, www.imriresearch.com, Leicester, UK.

Quirk's, Research Resources Glossary, pp. 57, 66, 73, www.quirks.com, Minneapolis.

Quirk's Marketing Research Review, A measured response, 1997, pp. 1–4, Article QuickLink No.: 0251, Quirk's, Minneapolis.

Rigney & Associates, Marketing Research Glossary of Terms, 2001, pp. 1–5, www.rigneyassoc.com, San Francisco.

Sage Research, Research Glossary, Title Data Unknown, p. 1, www.sageresearch.com, Natick.

* cited by examiner

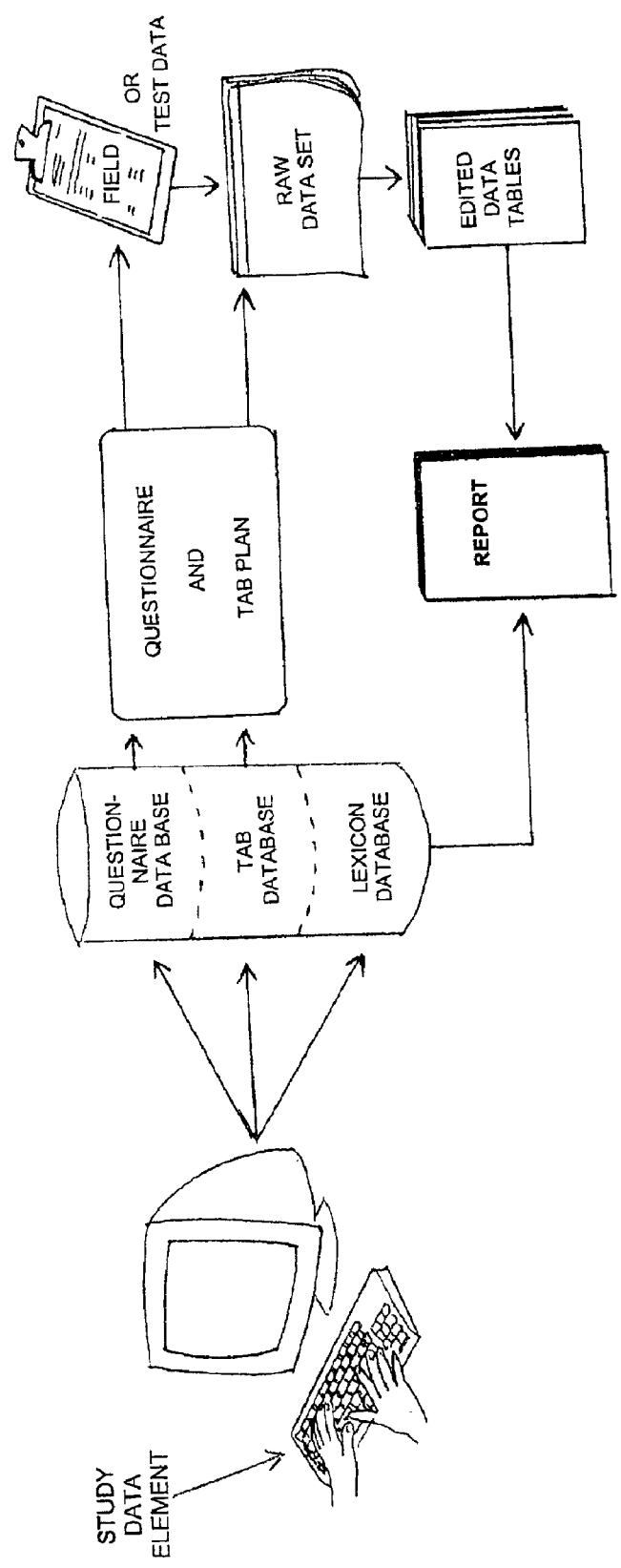
FIG 1: Flowchart depicting the new research design flow using the present invention.

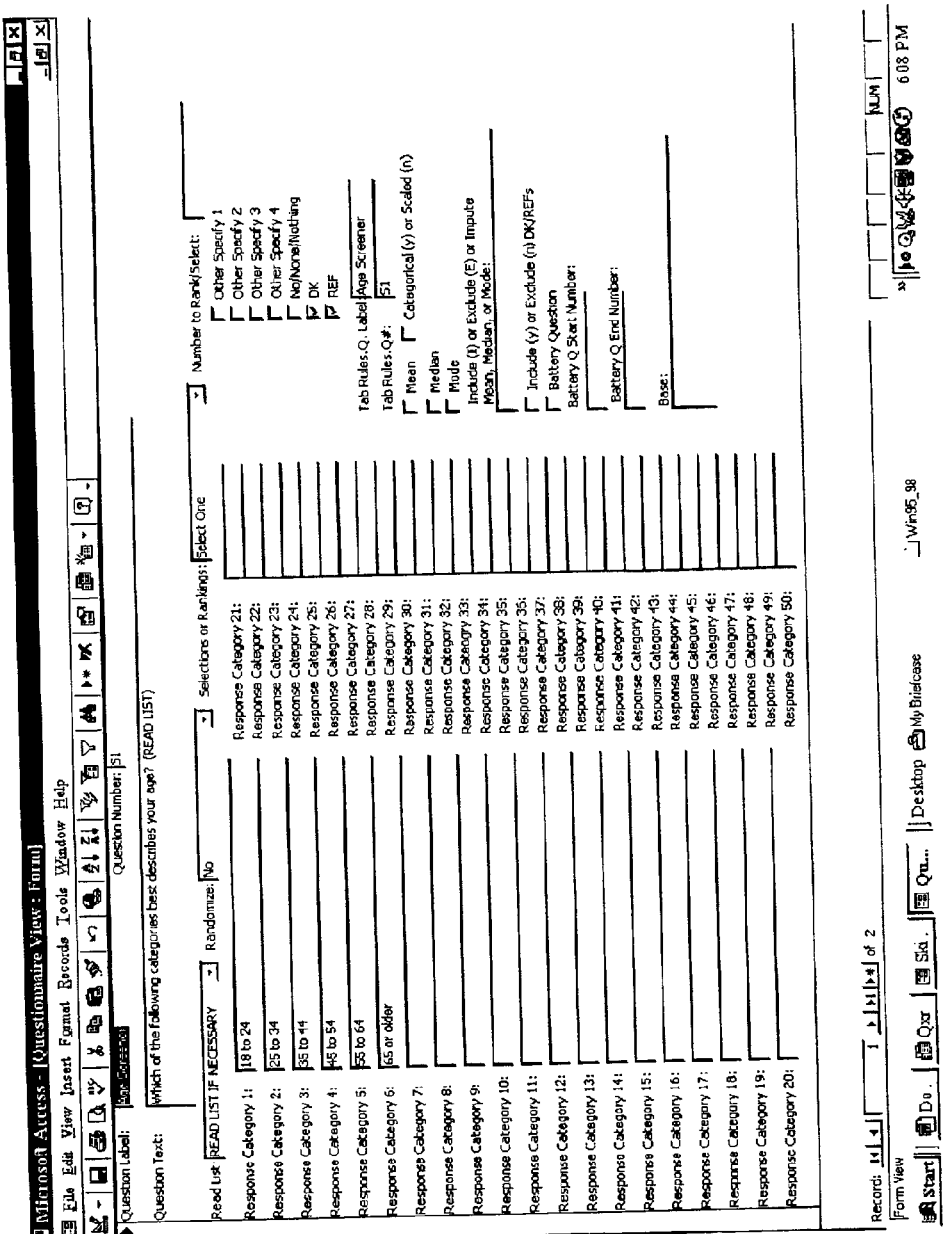
FIG 2: Detailed data entry screen for initial questionnaire design.

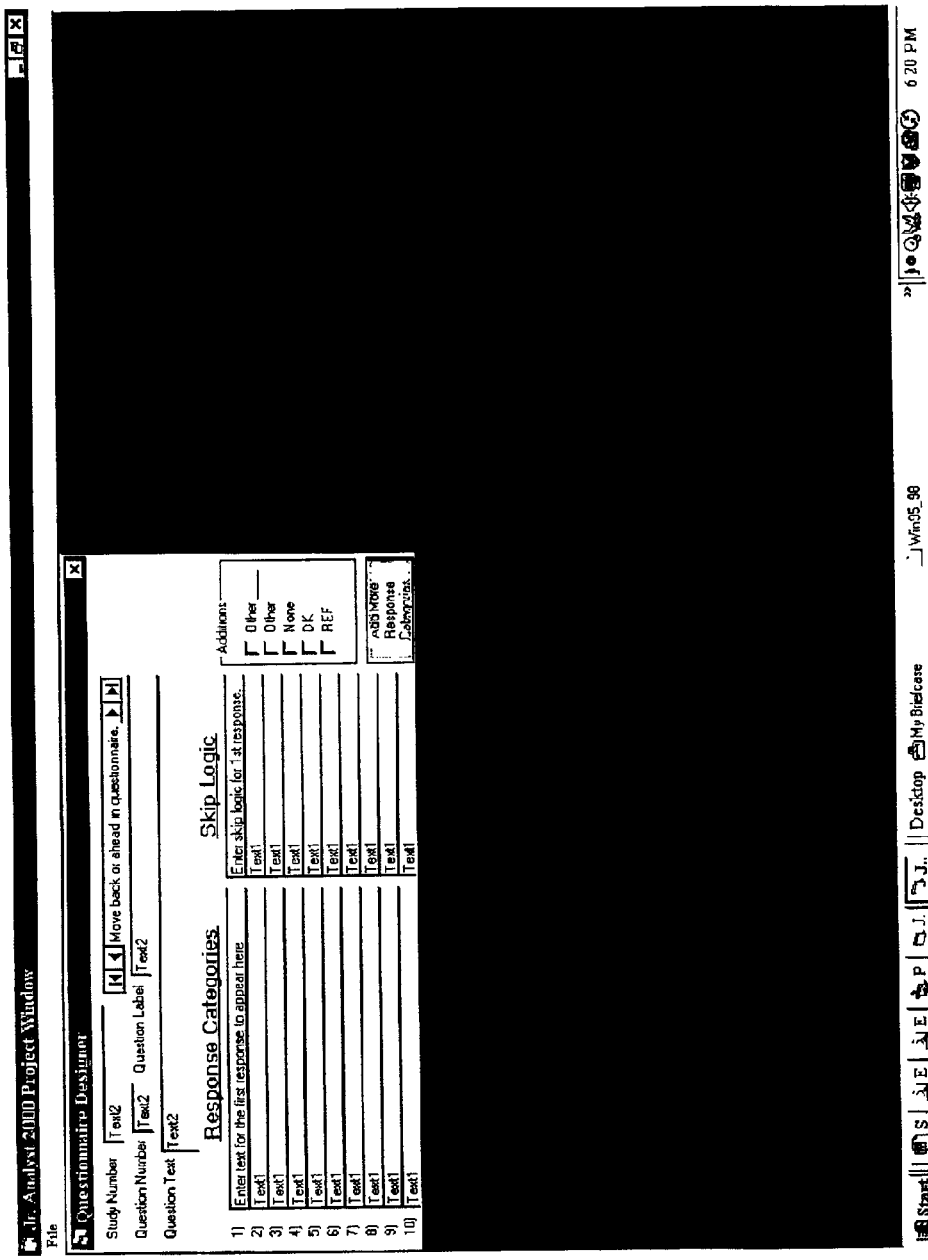
FIG 3: Response category editor and skip logic assignment form

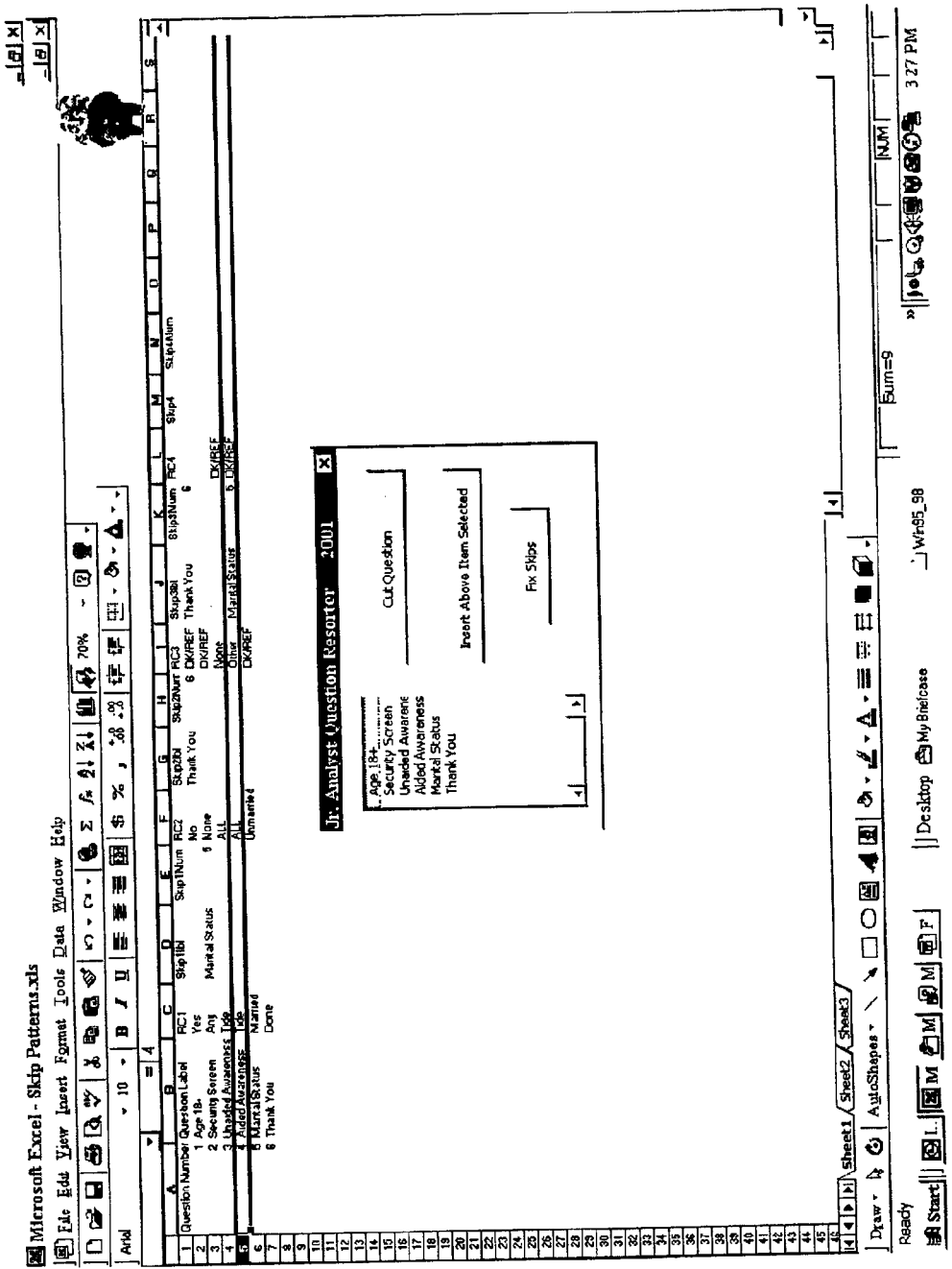
FIG 4: Question renumbering control.

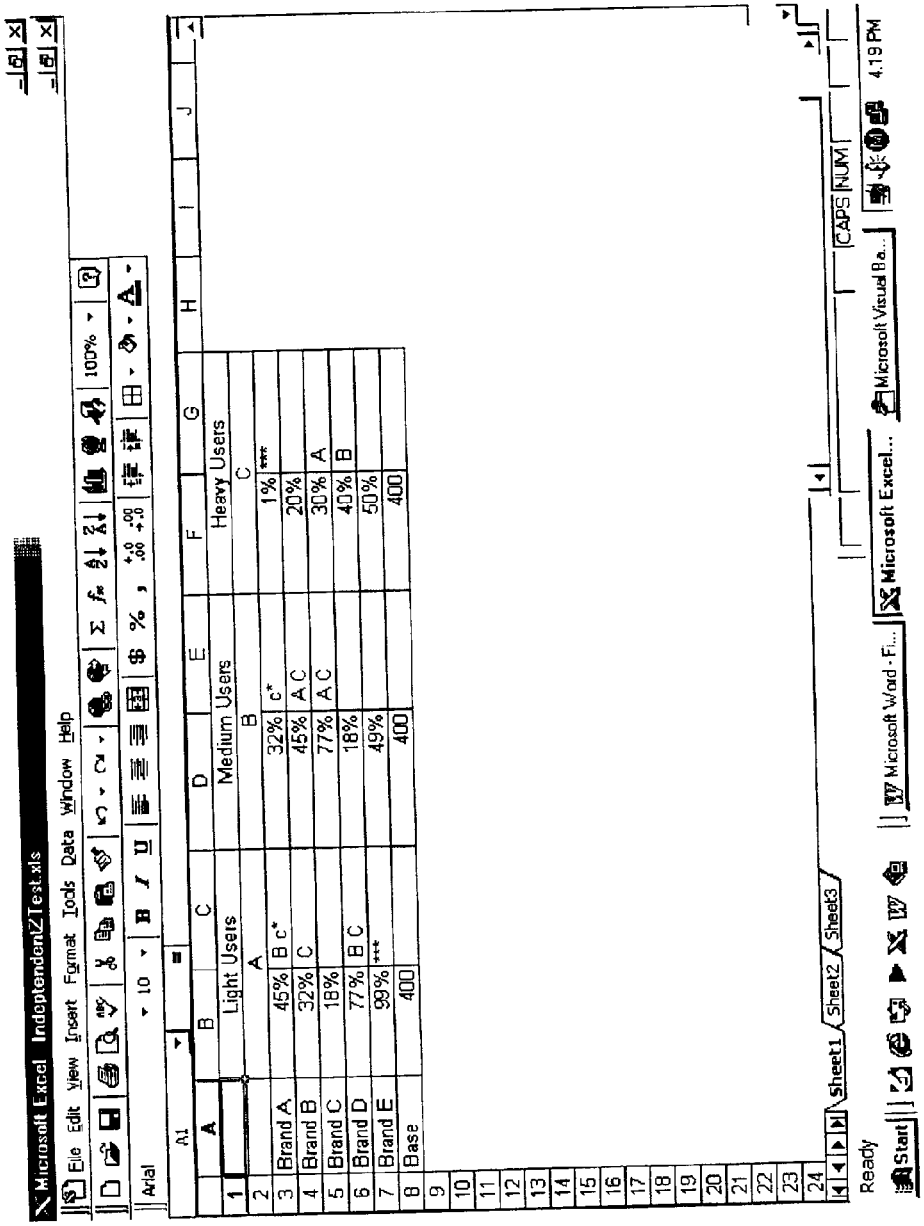
FIG 5: Tables after application of z-test of statistical significance.

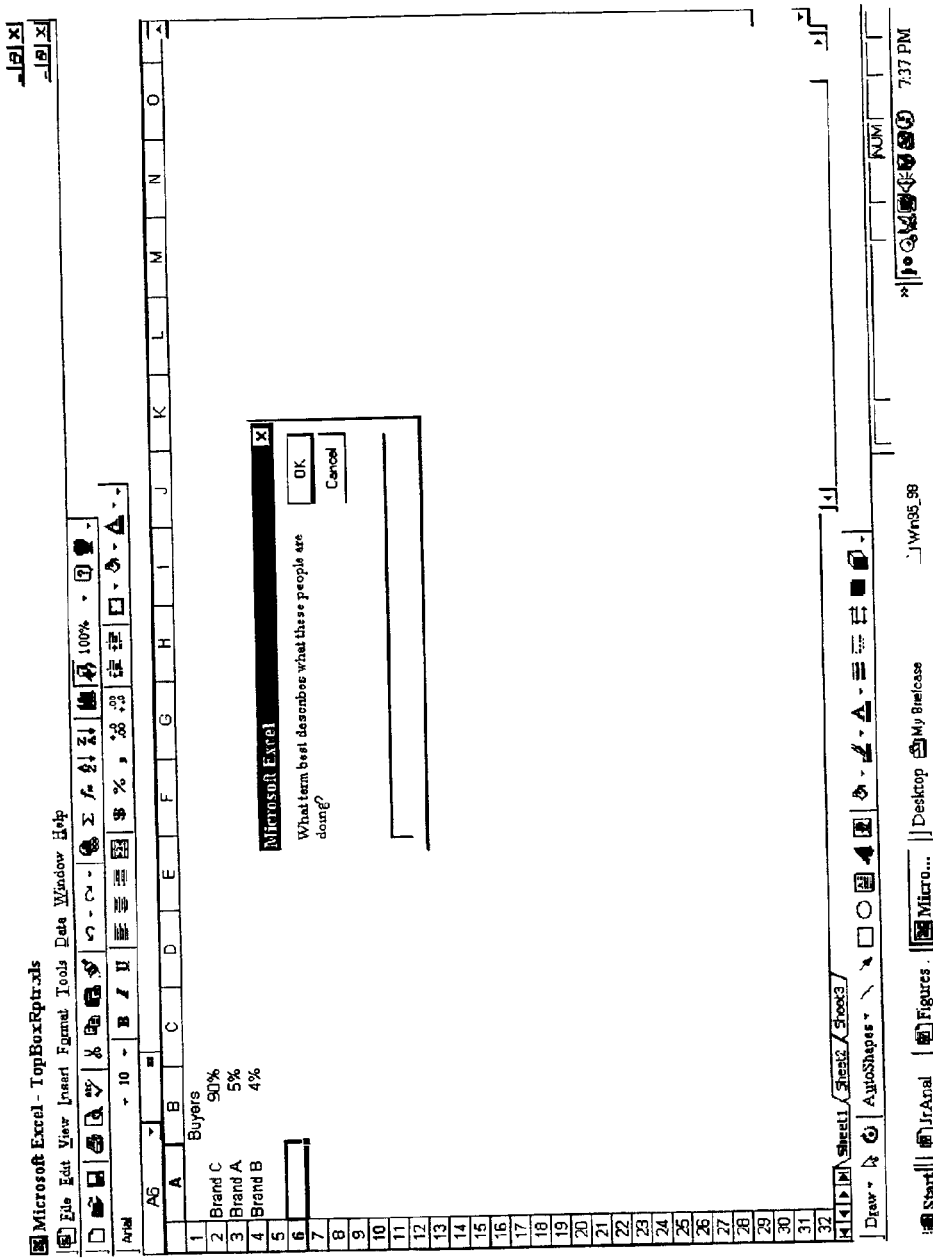
FIG 6: Lexicon-building interface.

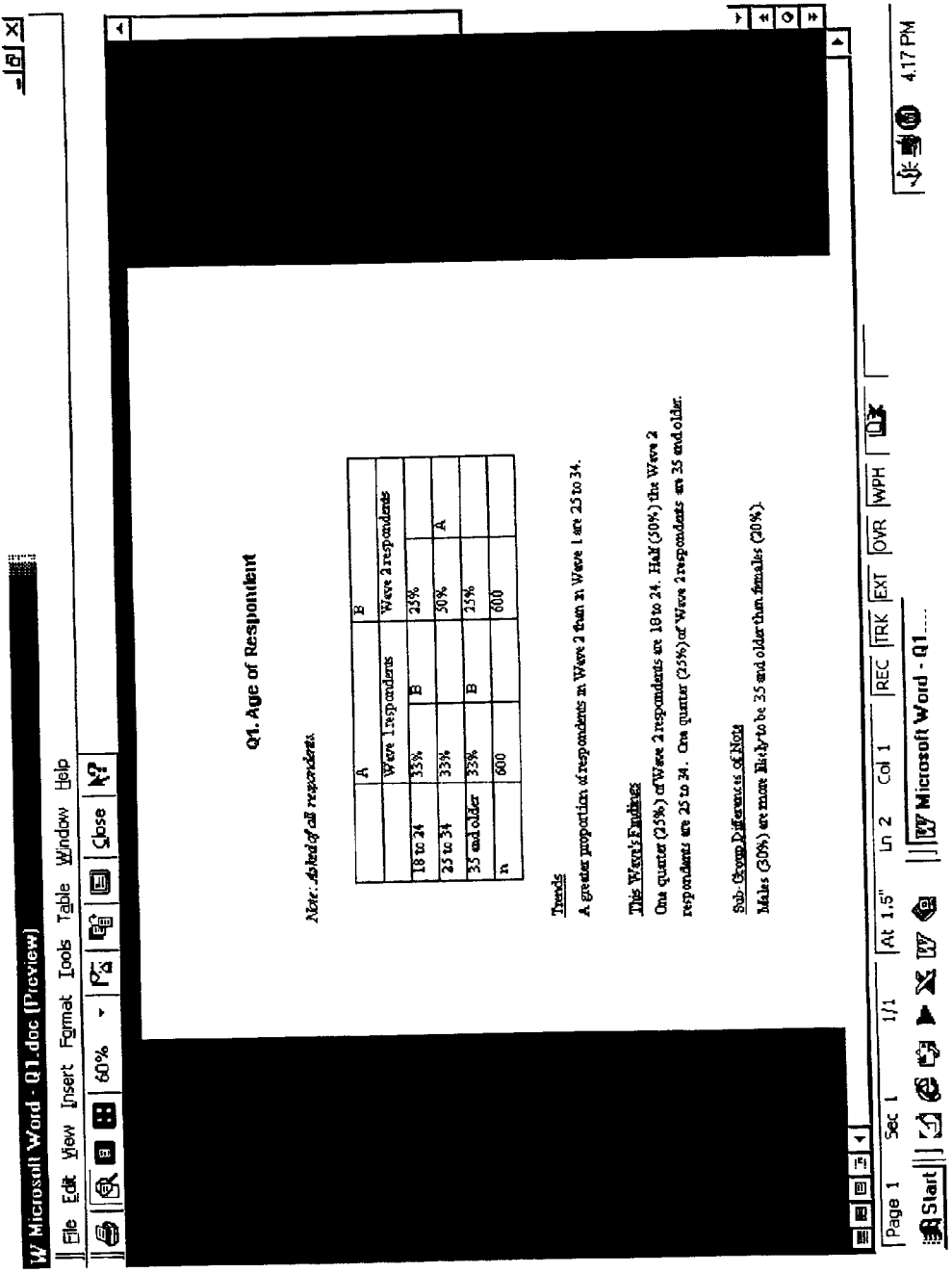
FIG 7: Report text after running report writing module.

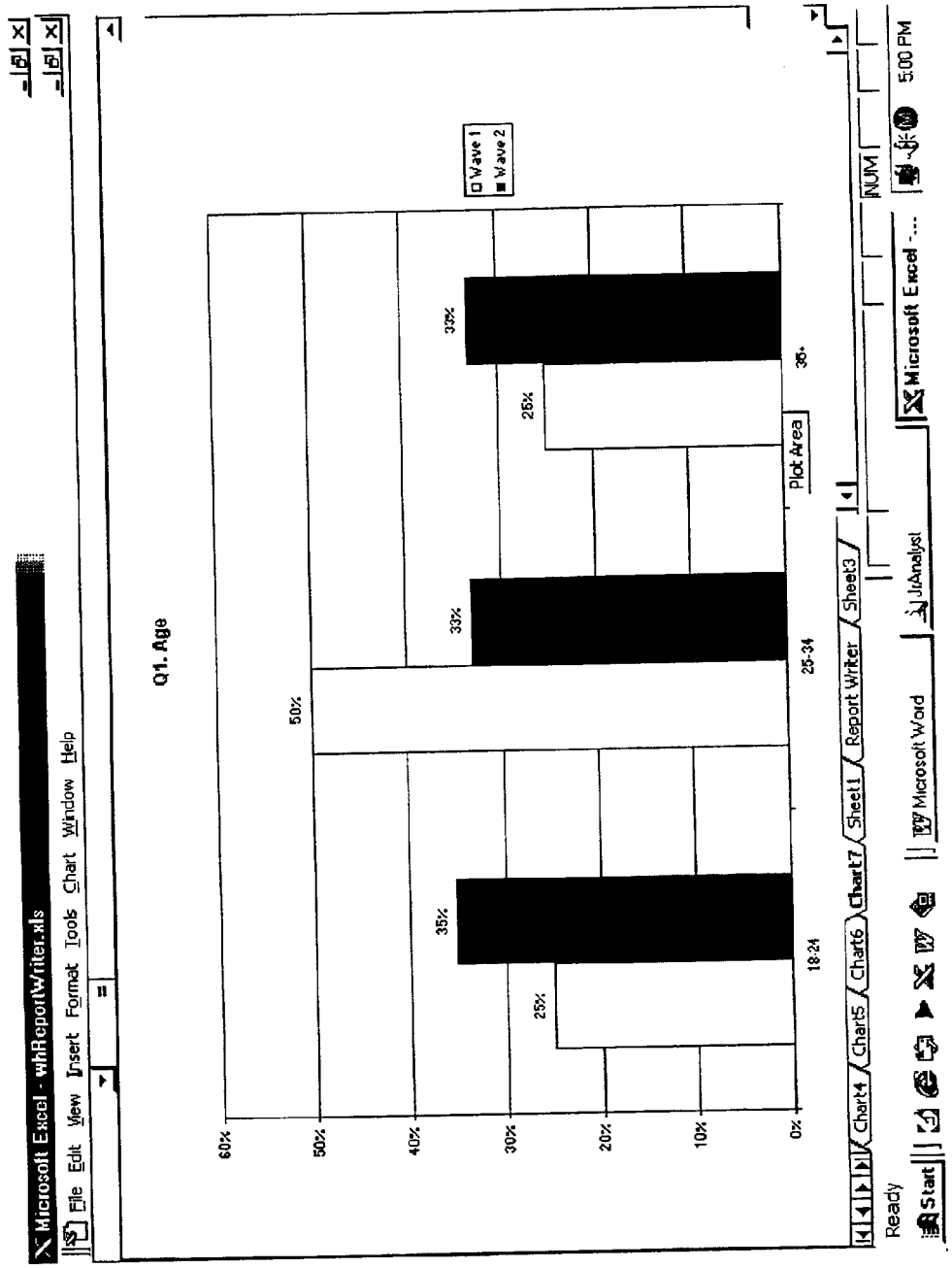
FIG 8: Chart after running chart generation module.

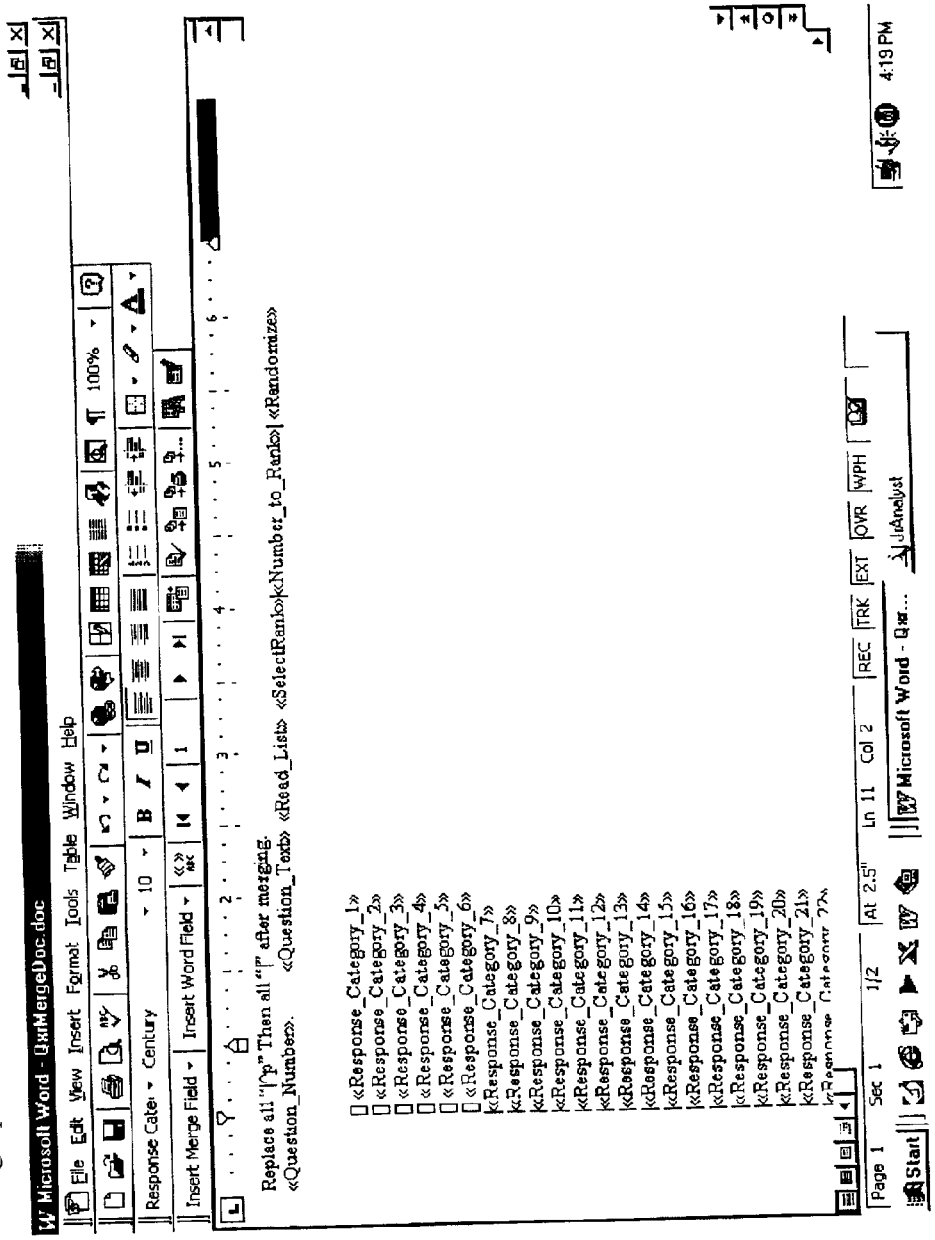
FIG 9: Mail-merge questionnaire template.

FIG 10: Analysis form.

METHOD AND APPARATUS FOR THE DESIGN AND ANALYSIS OF MARKET RESEARCH STUDIES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

SOURCE CODE APPENDIX

This patent document contains a source code appendix, including a total of 73 pages.

Code for 10 Microsoft VBA (Visual Basic for Applications) Excel modules and 1 SPSS syntax module are included in this appendix, however the code could be written equally well in any computer programming language. While brief in form, they are not intended to limit the application of the present invention, but rather are intended to illustrate, to those of average ability in the art, the salient methods introduced to market research by this invention. These code illustrations are, in order of appearance:

Module 1: Skip pattern module 'method of reordering questions.'
Module 2: Syntax generating module.
Module 3: WinCross table preparation for stat-testing module.
Module 4: SPSS table preparation for stat-testing module.
Module 5: Z-testing module for testing banner points against each other with column relabeling.
Module 6: Confidence interval module for testing columns of proportions against themselves.
Module 7: Z-test module for testing banner points against a total column.
Module 8: Sorting module.
Module 9: Lexicon-building and text generating module.
Module 10: Chart generation module.
Module 11: SPSS data cleaning module.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention pertains to the field of market research.

Survey research has become an integral part of modern life. Marketers, politicians, sociologists and others design, field, and analyze the results of surveys to improve their decision-making. Despite the importance of survey research to the nation's economy and to administration of large organizations, for the most part the art of survey research is practiced as it was half a century ago. Where improvements have been made, they have been in the areas of 1) word processing technology, 2) data collection technology, such as CATI (Computer Aided Telephone Interviewing), IVR (Interactive Voice Response), optical survey scanning software, and web-based survey software, 3) data tabulation technology, such as Quanvert, WinCross™, and SPSS (R) tables, and 4) presentation technology, such as Microsoft PowerPoint (R) or Harvard Graphics (R), as well as computer projectors.

Each of these technological advances has increased either 1) the speed with which changes can be made to documents, such as questionnaires or reports in the cases of word processing and presentation technologies, 2) the accuracy and consistency of the data collected, in the case of data collection technology, or 3) the depth of analysis which can be conducted, in the case data tabulation technology.

While each of these advances has greatly improved the utility of survey research, they were developed independently, at a time when human labor was less costly and there was not such a scarcity of trained market researchers, relative to demand, as there is today. Additionally, the ability of software to be programmed to mimic repetitive human-decision making has not been made use of for the most ordinary market research tasks.

The result is a research industry dependent on the implicit knowledge of analysts to properly carry out market research studies. In practice, the intricacies of a proper study design are frequently forgotten, and then recalled again at the last minute, resulting in repeated errors of omission and inconsistency. The present invention standardizes and rationalizes the seemingly unconnected pieces of the market research process and warehouses them into one all-inclusive framework and provides the tools to easily access and transform those pieces into readable market research reports.

Recent interest in the internet has resulted in a plethora of web-based survey tools which attempt to embrace the whole of the study process for online surveys, however these programs have been designed by web-based programmers, rather than market researchers, resulting in a multitude of products which either: a) are ignorant of market researchers' actual needs (for example, none of the stand-alone end-to-end web products currently on the market offer the ability to make wave-to-wave comparisons of data-the bread and butter of the market research industry, known as tracking studies; none allow cross tabulation by multiple banner points or the ability to filter question bases, also fundamentals in the field of market research; nor do these products allow researchers who outsource the field phase of research to benefit from their programs, even though it is the modus operendi for Fortune 2000 research departments and independent consultants), b) are tied to one field methodology, such as phone or internet, and require researchers to switch to a different software platform in order to conduct research through a different field channel, c) do not fully perform the functions they advertise (many advertise reporting capabilities, but data tabulation is all that is offered), d) are incompatible with data sources and formats commonly used in market research, e) assume perfect collection of data in every study (which is such a rare case that research firms actually employ entire departments, usually known as the data consistency department, to correct errors of omission, abandoned question branches and the like, or f) are custom-designed for a single, large-scale study and are thus not portable to new studies.

The result is that today the field of market research has dropped behind other industries in relation to the level of automation found in the processes used. This lack of automation falls into two areas: 1) not reusing data already input into a computer, due to incompatibility between market research programs used in different phases of the study process, and 2) the assumption that many processes, which follow clear heuristics, must be performed by humans.

This first area contrasts sharply with fields such as engineering, where CAD (Computer Aided Design) and CAM (Computer Aided Manufacturing) are heavily employed, allowing the same drawings created by architects to be used and modified by manufacturing plants without having to reprogram designs from scratch. On the contrary, the field of market research still involves reprogramming from the ground up at several points in the research process. To provide a context to understand the current invention, I outline here four major times that the data are re-entered for a market research survey, although the number is often greater in practice.

The first time the data for a market research survey are entered is when the questionnaire is originally designed by an analyst. This is typically done by typing questions into a word-processing program template, often borrowing wording of some questions from previous questionnaires.

The second time the data for a market research survey are entered is when the word-processed questionnaire is programmed into a format that can be fielded. Currently this most commonly means programming for being: 1) fielded over the telephone using CATI, 2) fielded by mail using a specially printed and typeset form which can be scanned, 3) fielded over the internet, using HTML forms and CGI scripts to collect the data, or 4) fielded using IVR by programming a computer script and recording an actor's voice reading the questions.

The third time the data for a market research survey are entered is when the survey data are exported into a database. Despite the fact that the surveys were already held in a database of some sort for fielding, the data are typically exported into an ASCII, MS Excel (R), or SPSS format without any data labels. This means that an analyst must type the question labels and response category labels into a data tabulation program, such as SPSS or WinCross. Many patched-together approaches have been used by individual data tabulation programmers to reduce the amount of rework required. These approaches generally involve cutting and pasting question text from either the CATI script or the word-processed questionnaire into a data tabulation program. The CATI programs InfoZeroUn and Quantum, do allow the CATI scripts to be automatically output in an SPSS format with labels, requiring only about one hour of work. The drawback to drawing labels from CATI scripts is that they are usually both overly long and incomplete for the purposes of data tables, because they use the complete question text as a label, which is generally too long for the purposes of tabulation and the text length limits imposed by tabbing programs. As the match between the need for the data tables and the CATI script is poor, this actually results in a data analysis specialist returning to the data tabulation program to retype the majority of question and response category labels by hand.

The fourth time the data for a market research survey are entered is when the market research report itself is written. The summary results, usually known as the detailed or general findings are simply prose, tables, and charts, which explain the information contained within the data tables to one who is not trained in reading data tables. This particular step, the fourth step in this enumeration, actually encapsulates multiple additional re-entries of the data: one time for any charts, one time for any special tables, and one time for the text of the summary results.

Even though clear heuristics exist in market research, few have been automated. This accounts for the major reason customized automation processes for market research reporting have not been expanded from large-scale, fixed format studies to the custom research market. Two major examples of decisions postponed by analysts for a lack of data are: 1) banner point definitions for data tables, and 2) how to best break up response categories to statistically test for reporting purposes. For the first type of decision, analysts currently wait until a complete dataset is received to apply their heuristics to the data to see if there will be large enough sample groups against which to run statistical tests. If the sample groups are too small, they eliminate that pair of banner points. For the second type of decision, an analyst will manually type in each paired combination of proportions within a question into a statistical testing program until a statistically significant difference is found. This can take an hour or more per question, and often results in no new statistically significant finding. Automating this step is of great benefit to analysts.

Statistical testing capabilities, needed by market researchers, are rarely found outside of specialized data tabulation programs, such as Quantum or WinCross and none of the programs currently on the market combine margins of error to statistically test rows of categorical proportions against each other. All use the Chi-Squared test instead, which is of little use in product and concept tests, where differences in the performance of an assortment of various brands is often sought.

Several problems are inherent in the current system of entry and re-entry of the data and postponement of study decisions due to a lack of complete data. These are the:

complexity and error prone nature of the systems needed to manage the process (e.g., manual updates to the original questionnaire, data tabulation plans (or tab plans), table syntax, data tables, written reports, demands to mentally track the inter-related nature of these changes to other parts of the research process, and frequent data consistency checking from one stage of the market research process to another), including most especially the error of improperly updating skip-patterns, resulting in incorrect question-branching, a costly mistake which can result in re-fielding portions of a survey, and similar types of errors in data tabulation where abandoned branches of a CATI or web-based questionnaire, or data-entry mistakes, lead to respondents reporting answers for questions they should not have been asked);

difficulty in locating and working with the latest versions of interrelated study documents and data sets throughout the study steps (this lack of consistency results in much reworking of data sets and final documents when errors are inevitably discovered);

difficulty for analysts to understand what is required for a survey, as all of the study elements must be generated from a mental map, rather than being aided by an all inclusive template, a lack of an efficient mechanism, in current market research methodologies, to maintain consistent labels, terms, and data definitions across the various computer applications used for market research;

a failure to recognize, appreciate and enable the dependencies between data and documents throughout the study steps, this is currently done through the mental cataloging and cross-indexing of a study's details, a complex matrix known only intrinsically by the analysts who must maintain the consistency of the questionnaires with the CATI script along with the data tabulation script, the summary results and the findings;

slowness of a process, during the study phases, to handle situations where data definition changes force a series of related changes in the different, independent computer applications used for market research.

The current invention greatly reduces these sorts of problems by using a database design which collects, stores, organizes, processes and makes easily accessible, all the data elements entered during the market research survey process, from questionnaire development to data reporting by using a rule-driven artificial intelligence program to draft the market research report in prose language.

Heretofore, a limited number of patents and publications have disclosed certain aspects of market research design and analysis systems, the relevant portions of which may be briefly summarized as follows:

U.S. Pat. No. 4,006,737 to Cherry and Isaac Raymond, Feb. 8, 1977, discloses a heart monitoring device which recorded, summarized and reported sampled heart data in printed form. However, this is not a market research study design or analysis tool. Moreover, Cherry and Raymond's invention makes no attempt to translate the data from raw numbers into syntactically correct prose sentences.

U.S. Pat. No. 4,839,822 to Dormond, et al., Jun. 13, 1989, discloses an expert diagnosis system for suggesting medical treatments for physical trauma. The invention of Dormond, et al. has in common with the present invention a reliance upon the body of knowledge known as AI or artificial intelligence. Apart from this commonality, the Dormond, et al. invention varies from the present invention in that, while it employs complex heuristics to determine potential treatments, its reporting is little more than a mail merge of pre-typed paragraphs corresponding to tables of potential diagnoses. Unlike the present invention, it does not dynamically create prose syntax from a combination of data elements nor does it use statistical tests to translate data tables into newly written prose.

U.S. Pat. No. 5,832,504 to Tripathi, et al., Nov. 3, 1998, discloses a data table formatting system, which allows manipulation of the color, font size, and border line layout for data tables. This invention lacks any market research study design aspects. Although called a 'report' generator, the actual output is simply what is known as data tables in the context of the current invention. Again, no attempt is made to translate the data from raw numbers and labels into syntactically correct prose sentences.

U.S. Pat. No. 6,189,029 to Fuerst, issued Feb. 13, 2001, discloses a web survey tool builder and result compiler, which allows questionnaire design, fielding, and data tabulation. However, Fuerst's invention does not allow the analyst to use any of the other market research methodologies available (such as mail surveys, telephone surveys, in-person mall-intercepts, or interactive voice response) nor does it provide a prose report summarizing the statistically significant findings from the data tables.

The first two of the aforementioned patents are for medical diagnosis equipment which, is used to determine which of a series of diagnoses to offer. However the phraseology of these reports is set in a template, and the back-end database design and report design had no applicability to market research. These reports tend to print out on one page and do not read in grammatically correct language, whereas the current invention uses simple artificial intelligence heuristics to craft a lengthy research report phrase-by-phrase, in idiomatic prose language.

The present invention is based upon other prior art, including: relational databases, word processing programs, spread sheet programs, presentation software (such as Harvard Graphics), and commonly known statistical formulas (such as Student's T-statistic, the z-test of means and proportions, the Chi-Squared distribution and their applications, such as CHAID). This prior art also includes the following Microsoft Corporation programs: Access, Excel, Word, PowerPoint, Visual Basic. Also included are software programming and text mark-up languages: BASIC, HTML, Perl; and products of the following companies: Sawtooth Ci3 CATI software, Survey Said, Survey Tracker, and Raosoft.

This prior art also includes the following books: Statistics for Business and Economics, $6^{th}$ Edition McClave, James T. and P. George Benson, Published by Dellen-MacMillan, 1994; Marketing Research Methodological Foundations, Sixth Edition, Gilbert A. Churchill, Jr., The Dryden Press, 1995.

The program is designed for market research analysts familiar with Microsoft Word, Microsoft Excel, and SPSS, three of the most commonly used applications in the field of market research.

BRIEF SUMMARY OF THE INVENTION

This invention is a computer program which automates the most common processes in market research study design and analysis, independent of the field methodology employed, by combining a database framework designed to hold all the data elements used in a market research survey, codifying heuristics actually used by analysts to make decisions about survey analysis, and building a lexicon to communicate summary results to lay readers in prose, thus allowing analysts to spend less time doing the redundant work of data tabulation and summary reporting. This frees analysts to take the time to combine the summary report generated by the program, any prior qualitative or secondary research conducted on the same topic, their own knowledge of the particular market and related marketing theory and to synthesize that information into a higher level analysis of the survey result.

It does this by:
1) automating the process of matching up wave-to-wave data tables, and then reporting the statistically significant differences from one wave to another,
2) writing syntax that data tabulation programs can read to create cross tabulations with multiple banner points,
3) being independent of any particular data collection field methodology,
4) automating several data cleaning functions to ensure the quality of the data tabulated, specifically:
   a) taking data table base definitions from the original survey design input form in order to filter out respondents who should not have been asked questions, but accidentally were,
   b) editing out multiple responses to questions requiring a single response,
   c) allowing backend data editing in a database or spreadsheet,
5) offering all the features usually required to actually carry out a primary market research inquiry,
6) working with the most popular data analysis formats used by market researchers (i.e., SPSS and Excel),
7) being customizable for each new study conducted,
8) centrally storing all the data elements required to complete the study in a database accessible and compatible with the different uses of the data (e.g. questionnaire, tab plan, CATI script, data labeling syntax, table script syntax, and prose report of the survey results), 9) automating the heuristics used by analysts to determine banner point definitions within studies,
10) providing a means by which to statistically test data tables held in spreadsheets, and
11) reporting statistically significant study results in prose language, with controlled input from a research analyst.

This method of market research study design and analysis substantially reduces the time and labor hours required to conduct a quantitative market research study by enabling analysts to specify all the study parameters prior to fielding the study, and to update a single database, using an efficient spreadsheet-database searching and matching script to ensure referential integrity as inevitable changes occur during the study process. Additionally, using rule-based decision-making, a complete, written summary report of detailed findings is generated, in just a few minutes, to focus on any population sub-groups of interest. This saves days over the current methods of reporting, which require the use of a plurality of disparate, unlinked programs. In its preferred application, as a computer program, it forces all major study decisions to be specified prior to fielding any given survey instrument. This up-front, all-encompassing framework provides the additional benefits of increased thoroughness and relevancy of questions asked, as analysts, at design time, are able to actually preview what results might look like at the completion of a study, rather than having to imagine what outcomes might look like on the printed page.

BRIEF DESCRIPTION OF THE SEVERAL VIEWS OF THE DRAWING

FIG. 1: Flowchart depicting the new research design flow using the present invention.

FIG. 2: Detailed data entry screen for initial questionnaire design.

FIG. 3: Response category editor and skip logic assignment form.

FIG. 4: Question renumbering control.

FIG. 5: Tables after application of z-test of statistical significance.

FIG. 6: Lexicon-building interface.

FIG. 7: Report text after running report writing module.

FIG. 8: Chart after running chart generation module.

FIG. 9: Mail merge questionnaire template.

FIG. 10: Analysis form.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In its preferred application, the invention is a computer program which facilitates the design of a market research questionnaire, and which collects sufficient parameters to generate what are known to those of average ability in the art as: a questionnaire, a tab plan, data tables showing statistical testing, and detailed findings for each question.

The invention can be programmed in a spreadsheet or a database with macros, or can be programmed and fully programmed using a fourth generation language (4GL) or lower, such as Visual Basic or C++.

The program has three (3) main components-programs, which assist a data analyst through the research process:
1. Questionnaire design program.
2. Data tabulation program
3. Report writing program.

It should be noted that these component-programs process research data elements as they pass through the phases of a market research study regardless of the actual field methodology used to collect the survey data.

The three (3) component programs have modules, as enumerated below.
1. Questionnaire design program.
   a. Questionnaire and data tabulation data-input form (see FIG. 2).
   b. Questionnaire/tab plan table (see description on pages 15 to 16 of this document).
   c. Skip pattern adjustment and correction (see Module 1 in the code appendix and FIG. 4).
   d. Word-processed documents for mail merges (see FIG. 9).
      i. CATI
      ii. Online
      iii. Mail
      iv. Mall-intercept
2. Data tabulation interface program.
   a. Label syntax generator for a data tabulation program, such as WinCross or SPSS for both single response and multiple response questions (see Module 2 in the code appendix).
   b. Banner syntax wizard to determine banner points and syntax for a data tabulation program, such as SPSS or WinCross. (Labels are determined for banner points, predicated on a sufficient sample size at the close of fielding. The actual banner points which qualify for inclusion in the tables are determined by computer code when a final data-set is received.)
   c. Test data generator, which randomly generates responses between the minimum and maximums allowed by each question, based off of the questions proceeding it, and randomly selecting more than one response for multiple response questions.
   d. Syntax to export tables from a data tabulation program to a spreadsheet (e.g. SPSS to Excel).
   e. Module to prepare spreadsheet formatted tables for statistical testing (see Module 3 for WinCross Tables and Module 4 for SPSS Tables in the code appendix).
   f. Module to prepare multiple waves of a tracking study for wave-to-wave comparisons.
   g. Module to statistically test tables, column-by-column, in a spreadsheet (e.g. Excel). (See FIG. 5 for sample output Module 5 for background code and its variant, Module 7 in the code appendix.)
   h. Module to sort (if a categorical variable as specified in the questionnaire and data tabulation plan input form from module step (a) of the questionnaire design program) and statistically test tables row-by-row (see Modules 6 and 8 in the code appendix.)

3. Report writing program
   a. Banner point to response category correspondence lexicon-building wizard. (Illustrated in FIG. 6 and Module 9 in the code appendix).
   b. Module to generate detailed findings text.
   c. Detailed findings table (with 95% confidence intervals labeled). (See FIG. 7.)
   d. Module to generate charts (see Module 10 in the code appendix.)
   e. Word-processed document to merge with detailed findings text and charts via automation.

THE PREFERRED EMBODIMENT

This program enables questionnaire design through data-entry of questions, response categories, and skip patterns into an Microsoft Access or Microsoft Excel-style data base study design form This is the questionnaire and data tabulation input form (see FIG. 2). This easy-to-use form guides analysts to correct and complete question definitions. Missing values (i.e., response categories to exclude from any analyses and from the question base) are easily indicated via check boxes on the same form to fill-in the tab plan table. The form provides a means to ensure a thorough study design prior to implementation. The program is also non-limiting, in that if minor questionnaire changes are made in mid-field, only that portion which was changed needs to be reprogrammed, not the entire survey.

The data is stored in a table using the field layout structure shown below.

(Field label, Type, Number of Characters (if applicable), indication if indexed.)

Question Label, Text, 255 Characters, Indexed
Question Number, Text, 4 Characters
Question Text, Text, 255 Characters
Read List, Text, 50 Characters
Select/Rank, Text, 50 Characters
Number to Rank, Number, Integer
Randomize, Text, 50 Characters
Response Category 1, Text, 255 Characters
Skip Logic 1, Text, 50 Characters
Response Category 2, Text, 255 Characters
Skip Logic 2, Text, 50 Characters
.
.
.
Response Category 50, Text, 255 Characters
Skip Logic 50, Text, 50 Characters
Other Specify 1, Binary Logic
Skip Logic 51, Text, 50 Characters
Other Specify 2, Binary Logic
Skip Logic 52, Text, 50 Characters
Other Specify 3, Binary Logic
Skip Logic 53, Text, 50 Characters
Other Specify 4, Binary Logic
Skip Logic 54, Text, 50 Characters
No/None/Nothing, Binary Logic
Skip Logic 55, Text, 50 Characters
DK, Binary Logic
Skip Logic 56, Text, 50 Characters
REF, Binary Logic
Skip Logic 57, Text, 50 Characters The problem of question renumbering and double-checking skip patterns when a question is added at the last minute is solved by using question labels and simply assigning question numbers (as illustrated by FIG. 4 and Module 1 in the code appendix). Within the process of automation, by using question labels as the backbone of the survey database, rather than questions numbers, questionnaire renumbering and skip pattern adjustments are greatly simplified in a way not possible with the contemporary practice of using question numbers as the key field of reference in survey databases.

Questionnaires are easily compiled in a mail merge to a word processing program from a database or via more traditional database reporting methods. Through an automated step in the report output method, the questionnaire can be output in a plurality of formats, such as a client copy of the questionnaire, an annotated questionnaire for programming, a pre-coded questionnaire for mailing or mall intercept research, or an HTML questionnaire for online research. The questionnaire format is selected upon printing. Based on the type of questionnaire chosen by the user, a mail merged document with only those fields necessary for the selected format are included. For example, if an annotated questionnaire for programming is selected, questions which seek to eliminate response order bias will have the instruction "RANDOMIZE LIST" appear above the question with the potentially biased list order. On the other hand, the same survey database, if sent the command to print a questionnaire for an in-person mall-intercept style of study, produces that question with the instruction "ROTATE LIST," instead. This takes into account the fact that field interviewers have no means of "randomizing" a list, however they can simply (and commonly do, upon request) rotate the starting point in a list of categorical responses in an in-person mall intercept survey.

A data tabulation plan is held in a database table and contains the table titles, base definitions, number of banners, banner point definitions, summary statistics (such as mean, standard deviation, variance, or standard error), and instructions for which statistical tests to attempt to run against the question upon completion of the survey. The tab plan also accepts parameters for where to break sub-groups for analysis, based on user-specified heuristics, such as a 50%-50% split approximation, or programmatic rules such as a minimum sample size of n=30 in each sub-group to maintain a sufficient sample size to meet the minimum requirements of the central limit theorem for statistical testing of proportions. When a complete dataset is received, these heuristics are applied to the data to determine whether there are large enough sample groups against which to run statistical tests. If the sample groups are too small, the program eliminates that pair of banner points and replaces them with any user-specified alternative pairs of banner points.

To illustrate this point, consider the following case of how the present invention handles a series of age banner points. If the analyst desires young (18 to 34 years old), middle (35 to 54), and older (55 and older) age category breaks, he or she would select '3' as the desired number of age banner points. Unless otherwise specified, the program would attempt to find three equally sized groups upon completion of the market research survey. It would also run through heuristics, or rules, to determine the minimum sample size required to have three sub-groups. For example, if 100 respondents complete a survey, with the following results:

Age n
18–24 12
25–34 15
35–44 20
45–54 18
55–64 15
65+ 20 then the program searches through the following inputs in its database:

[DESIRED NUMBER OF AGE CATEGORIES =3] then runs through the following heuristics, or rules:

[VARIABLE=SCALAR (therefore age categories must be contiguous)]

[MINIMUM SAMPLE SIZE REQUIRED TO RUN THE Z-TEST=30]

[FIRST START AT THE LOWEST CATEGORY AND WORK UP TO FIND VIABLE RECATEGORIZATIONS, THEN WORK FROM TOP DOWN.]

[ALWAYS ATTEMPT FEWER CATEGORIES IF THE NUMBER OF CATEGORIES DESIRED FAILS THE SECOND RULE.]

[IF MORE THAN ONE SOLUTION IS FOUND, SELECT THE ONE WITH THE LARGEST MINIMUM BASE SIZE AMONG ITS CATEGORIES. IF EQUAL, RANDOMLY SELECT ONE, AND RECORD ALTERNATIVES IN AN OUTPUT LOG.]

[ONLY FAIL THE BANNER POINTS IF ONLY ONE CATEGORY MEETS THE DEFINING HEURISTICS ABOVE.]

Thus, the program ignores a single category solution of 18 and older (n=100). 18 to 24 alone fails (n<30) as an independent category. 18 to 34 fails (n<30). 18 to 44 passes (n=47). Moving onto a new potential group (i.e., 45 to 54), 45 to 54 fails (n<30), 45 to 64 passes (n=33). Starting onto a new potential group, 65+ fails (n=20). Now, starting from the top and working back down, 55+ passes (n=35), 35 to 54 passes (n=38), but 18 to 34 still fails. So, the viable combinations are 18 to 44 (n=47) and 45+ (n=53); or 18 to 54 (n=65) and 55+ (35). The first combination (18 to 44; 45+) has a larger minimum base size. So the two banner points which would be printed on the data tables would be the 18 to 44 banner point and the 45 and older banner point. This first banner point represents the combined 18 to 44 age groups (18 to 24; 25 to 34; 35 to 44) and the second banner point represents those 45 and older (45 to 54; 55 to 64; 65+).

Using a customized relational database report or a commonly available data tabulation program, such as SPSS or WinCross, analysts can tabulate the questions, then export the tables into a spreadsheet. The data tabulation interface module will even help prepare the tabulation syntax (module 2). Then analysts can statistically test the questions from the survey in a spreadsheet (see FIG. 5), using the program's statistical testing modules (see modules 5, 6 and 7 and FIG. 5).

However, there are certain aspects in the current ways that data tables are exported into spreadsheet formats that do not immediately lend themselves to automation. To correct for this, the program has two modules which take spreadsheet formatted data tables generated by leading tabulation software programs and standardizes the formats so that other parts of the program can manipulate the data within the spreadsheets without further intervention from a data analyst (see modules 3 and 4).

As part of this, the module prepares regular data tables for automated analysis by suppressing cell counts, but still showing sub-group sample sizes so that tests of proportions can be conducted. This format also allows Excel charts to be created for a final report without reediting the tables. Proportions are tested with z-tests of statistical significance at any desired confidence level, such as 99%, 95% or 90%. Module 7 in the code appendix offers a means by which to avoid re-editing and thereby maximizing productivity by showing statistical test results in bold, so that charts can still be generated from them without any re-editing of the source spreadsheet for a chart generation program, such as MS Chart. Banner points with fewer than 30 respondents are indicated or otherwise eliminated from tests of significance of differences in proportions. Means are tested with t-tests. A logical extension would running exact test of proportions for sample sizes under n=30.

In contrast to current tabulation program methods of determining question bases, the data analysis program asks the analyst who should be asked each question, rather than who should not be asked the question. Using reductive reasoning, computer scripts arrive at who should not be asked the question and relay that information to the data tabulation program in the form of a syntax script. Experienced analysts will recognize that this may save days of data processing where abandoned branches of a CATI or web-based questionnaire, or data-entry mistakes, lead to respondents reporting answers for questions they should not have been asked. This type of error is often not noticed for days, but would be essentially eliminated through the use of this program.

The program allows several options for editing raw data into an edited dataset, a requirement for nearly all market research studies. These options are:

1) When needed, data is edited in the database table, in a spreadsheet or in a statistical program, such as SPSS.
2) The data is cleaned before tabulation, by writing skip pattern edits in SPSS syntax, as indicated in the questionnaire and data input form. This syntax will lift out data from field variables and only place it in a tabulation variable if the respondent correctly answered earlier questions qualifying him or her for a given question. By so doing, abandoned branches of the questionnaire do not make it into the final dataset.
3) In terms of rounding, numbers are rounded up if the final decimal place ends in a '5.' For example, if a respondent entered '7.5' on a question requiring an integer response from 0 to 10, the edit rounds 7.5 up to 8. If, on the other hand, a respondent entered '7.49,' that entry would be rounded down to 7. If a respondent offers a range, for example from 7 to 8, then the program takes the average (7.5), then rounds up to 8.
4) Users are offered two options of how to deal with respondents checking two or more boxes (or the equivalent) in a question requiring a single response. The default is to initially code questions with multiple categories as a multiple response question and then to randomly select a single response, if there is more than one response to the question. Generally about 10% of respondents in a self-administered survey will incorrectly mark more than one category for a single response question in a survey. By using a uniform random distribution to select a single response we accomplish two things at once: a) we preserve case data, so that we have answers from a respondent early and late in a questionnaire (this is especially useful for later multivariate analyses), and b) we preserve the study-level proportions of category responses (within the statistical margin provided by the uniform distribution). As illustrated by Module 11 in the code appendix, the program randomly strips out single responses when single response (single punch) questions are accidentally responded to as multiple response (multi-punch) questions. Ranking questions can also be rationalized by this part of the program in cases where respondent mistakes result in multiple first, second, third or higher place rankings for one question. This is another common error, commonly edited by hand, however, using computer scripts to do this work shaves additional hours off of the study process. The other data-editing option to correct respondent checking of multiple boxes in a single response question is to perform a deletion. Within this option, the user can either delete the case or delete the variable for an individual respondent where a problem occurs.

Wave-To-Wave Comparison Data for Tracking Studies can be lined up and compared by the program for tracking studies. Any prior data tables which could be put into a spreadsheet can be used as prior wave source data for wave-to-wave comparisons. Examples of such table formats are: a) previous tables created by the program in Excel format, b) typed Excel tables, c) SPSS tables exported into Excel format, and d) WinCross tables exported into Excel format. In this comparison module, tables are brought up, question by question, for comparison with the new questions from the current wave. Only questions still asked in the current wave of a study are available for wave-to-wave comparisons. (In theory other waves could be called for, but in practice this function is hardly ever needed.)

In the Wave-To-Wave comparisons, the two sets of data tables are brought up side-by-side as in the following example.

| Wave 1<br>Q1. Age | Wave 2<br>Q23. Age |
|---|---|
| 18–34 | 18–24 |
| 35–54 | 25–34 |
| 55+ | 35–44 |
|  | 45–54 |
|  | 55–64 |
|  | 65+ |

The user of the present invention selects 18–34 from the column of Wave 1 data, and then selects 18–24 and 25–34 from the column of Wave 2 data. When the user presses an onscreen control button marked "MARK AS IDENTICAL" the program generates unique ID numbers which are assigned to both the one category from Wave 1 and the two categories from Wave 2. These ID numbers are stored in a table with a column of data containing the new question label they both qualify for: "Wave 1–2 Age." When later data tables are run for Wave 1–2 Age, the newly defined response categories (18–34, 35–54, and 55+) will be reported.

The largest advance offered by this invention is the report writing program. Although the other two components of this software application package (questionnaire design and data tabulation) offer interesting and useful advances, the report writing program draws upon these advances and adds another advance completely out of the reach of existing market research programs. By using straightforward psycholinguistic rules, and data-analysis heuristics which guide the report, the program creates a simple artificial intelligence framework which mimics human writing of a detailed findings section of a market research report.

A key element of this is a feature, for questions with ordinal data, that runs an algorithm to determine where the data could be best broken into two sub-groups by means of a statistical test using the Chi-Squared distribution followed by an analysis of normal distribution error bounds.

If there is a statistically significant break-point, the algorithm illuminates it, and reports on it in the detailed findings. No other software program on the market offers this level of automated analysis report writing. In the preferred embodiment, the portion of the report that would be written by this program would be the summary results, commonly known as the detailed findings, or general findings.

In broad terms, the detailed findings report generated will have the following sections (see FIG. 7 for a formatted illustration of such a report layout as described below). The layout for the reporting of an individual question may follow a format containing any or all of the following elements, which can be easily modified to match the formats of the various styles of summary results used by market research analysts.

Figure 10:
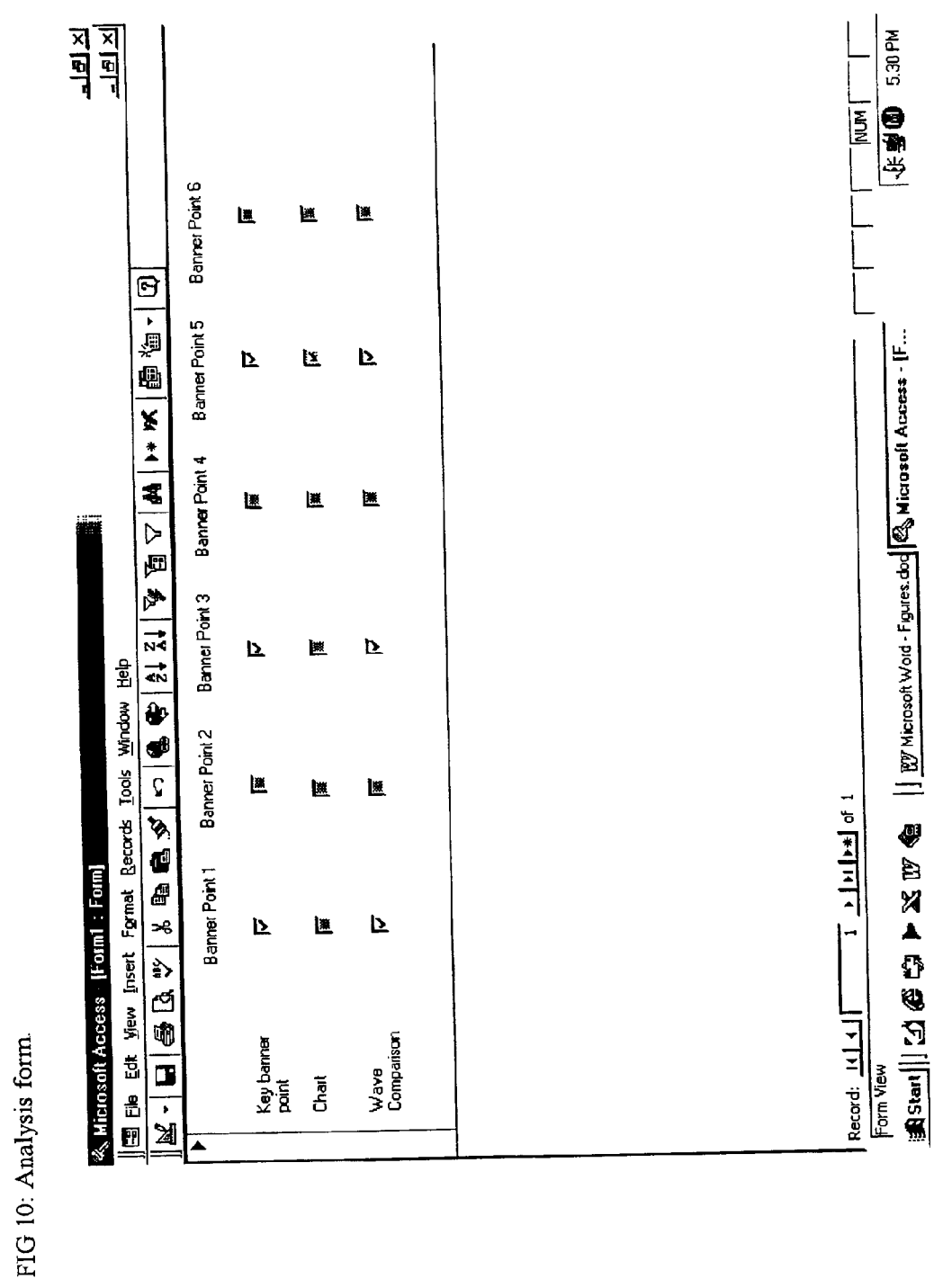

1. The report may be ordered by question number or by section.
2. The program prints out the question title in a header style, such as Microsoft Word Header 1 Style, (e.g. the style of "Q1. Age of Respondent," in FIG. 7).
3. The question base, from the data tabulations, is printed under each question title in prose.
4. A table is placed below the header, showing the total column and the one or two sub-groups of specific inquiry for the study (i.e., customers and non-customers or clusters, if in a segmentation study). In tracking studies this is typically the total from year-to-year or quarter-to-quarter. (See FIG. 7.) The user specifies this in the analysis form (see FIG. 10).
5. Under the statistically-tested table appear any trends (if in a tracking study) or total, in descending order (if a one wave study). The total appears in scaled order on scaled questions (e.g., revenues). (See Module 8 in the code appendix.)
6. Under the trends/total is the Total (as above) if a tracking study. In non-tracking studies any instructive sub-group differences from the main tab book are discussed briefly using the methods described on page 37 and illustrated in module 9 of the code appendix. In market research, there are typically target audience sub-groups to be compared, (i.e., users vs. non-users, donors vs. non-donors). These targeted sub-groups are identified by using the analysis form (see FIG. 10).
7. The program reports on any differences between targeted sub-groups, using the language supplied by the lexicon database. Analysts are prompted to enter words that relate the response categories to the question title or full text of the question. (Shown in FIG. 6.) For example, if the question title is "Age" and the response categories are 18–24, 25–34, 35–44, 45–54, 55–64, and 65+, then a word or phrase relating the question to the categories would be "is the," as in "18–24 is the Age of 30% of respondents." (See Module 9 in the code appendix.) A logical extension of this lexicon-building capacity would be a feature that allowed users to select from the last several terms which had been used to relate similar questions and response categories in prior studies.

An example of a report page appears below. (See FIG. 7 for a formatted version of the following.)

Q1. Age of Respondent

Note: Asked of all respondents.

|  | A<br>Wave 1 respondents | | B<br>Wave 2 respondents | |
|---|---|---|---|---|
| 18 to 24 | 33% | B | 25% |  |
| 25 to 34 | 33% |  | 50% | A |

-continued

|  | A<br>Wave 1 respondents |  | B<br>Wave 2 respondents |
|---|---|---|---|
| 35 and older | 33% | B | 25% |
| n | 600 |  | 600 |

Trends

A greater proportion of respondents in Wave 2 than in Wave 1 are 25 to 34.

This Wave's Findings

One quarter (25%) of Wave 2 respondents are 18 to 24. Half (50%) the Wave 2 respondents are 25 to 34. One quarter (25%) of Wave 2 respondents are 35 and older.

Sub-Group Differences of Note

Males (30%) are more likely to be 35 and older than females (20%).

The following method is used to develop the detailed findings report.

First, the analyst must specify whether each question is a scalar question or a categorical question in the data entry form for initial questionnaire design (see FIG. 2). Second, the analyst prepares the tables for statistical testing, using the program (see Modules 3 and 4 in the code appendix). Third, the analyst fills in the analysis form. Then, the program moves from table to table. Once a table is selected, the program statistically tests the table. Then each of three lexicons are accessed to translate each of the three parts of the analysis: trends, current wave differences (i.e., "This Wave's Findings"), and differences between sub-groups (i.e., "Sub-Group Differences of Note"). The banner points for the special small table showing statistical test results (see FIG. 7) are determined by what the user enters in the analysis form (see FIG. 10). Finally, the program scans each table for key information or data handles, such as banner points and response categories, which it then translates into prose using the lexicon modules (see module 9 in the code appendix and descriptions on pages 27 through 37), after statistically testing to determine which differences are statistically significant.

The method of moving from table-to-table, for tables exported into a spreadsheet format, is as follows:

In order to locate the starting row for each successive table within a spreadsheet, the program searches the first column in which the tables appear, row-by-row, for a cell which meets the following criteria:

Ignoring spaces, the leftmost characters in the cell must be: "Q." or "Q#." or "Q##." Or "Q###.," where '#' is an integer between 0 and 9.

Similarly, the ending row of the table is deduced to be the next row where the cell in column 1 contains only the letter 'n' or 'N,' (in its capitalized form).

An error occurs if there is a blank row between a posited starting row and the next ending row. In this case, an entry is appended to an error log and the program resumes its search for the next starting row.

Once a table is located by the program, that table is error tested for containing the proper syntax and layout for statistical testing purposes. In the event of an error, the error is logged and the program continues on to the next table. If the table passes the above layout and syntax checks, then the table is ready for processing.

The following process is then run:

A. Run lexicon for wave-to-wave comparison banner points, as determined in the analysis form.
  i. Run statistical tests (i.e., independent z-test).
  ii. Where differences occur, store them into memory.
  iii. Run syntax rules and apply wave-to-wave lexicon; store paragraphs.
  iv. Store additionally processed question into automated report source table in a memo field.
B. Run lexicon for a single banner point against key banner points.
  i. If the table is for a categorical question, as specified in the initial questionnaire-design input form (see FIG. 2), sort.
  ii. Calculate the 95% error bounds; store lower bar in one array; store higher bar in another.
  iii. Run syntax rules and apply lexicon; store paragraph in a memo field, or in some type of variable allowing length over 255 characters.
  iv. Create a table with special statistical tests that can later be merged into MS Word (see FIG. 7).
  v. Run the lexicon for a single banner point against key banner points, as specified in the analysis form, (see FIG. 10).
  vi. Store partially processed question into a table that will later be the source for a automated report.
C. Run lexicon for current wave differences.
  i. Run statistical tests (i.e., independent z-test).
  ii. Where differences occur, plug them into memory.
  iii. Store the differences.
  iv. Run syntax rules and apply current wave lexicon; store paragraphs.
  v. Store processed question into a table, for later reporting, in a memo field.
D. Run automated report (e.g. mail merge)
  i. Take question number from questionnaire table (see pages 15 to 16 of this document).
  ii. Take question label from questionnaire table (see pages 15 to 16 of this document).
  iii. Take question text from questionnaire table (see pages 15 to 16 of this document).
  iv. Take base definition from tab plan table (and convert to prose).
  v. Output into a spreadsheet or word-processing program.

The way that the program generates the trends text is explained in the section immediately following the term definitions below:

Umbrella pt.=Umbrella point. Overarching banner point, such as age, gender, amount of use, etc.
bp=bottom level banner point
rp=relationship word or phrase which connects the question label to the response categories.
rc=response category.
W1% the percent of respondents on the table who choose this response category in the first wave under consideration for this table and question.
Wave label=simply a label. Most commonly "Wave" or "Year."
pl wave label=the plural form of the wave label.
Wave #1=the first wave under consideration for this table and response category.
DIRECTION=directional verb or verb clause.
Qlabel=the label used to describe the question for the lexicon.

rc mod=response code modifier. Used when prose syntax requires it.

Statements for when No Change Occurs

One of the following statements is randomly selected to translate into prose the situation wherein no statistically significant changes occurred from wave-to-wave.
(1) [Qlabel] "broke out the same as in" [Wave label] [Wave #1] "."
(e.g., "Age broke out the same as in Wave 1.")
(2) "No trends emerged in our analysis of the" [Count of waves] [pl wave label] "of data."
(e.g., "No trends emerged in our analysis of the 3 waves of data.")
(3) "The proportions for this question have not changed in any significant way from" [Wave label] "-to-" [Wave label] "."
(eg., "The proportions for this question have not changed in any significant way from Wave-to-Wave.")
(4) "There are no statistically significant differences between" [pl wave label] [Wave #1] "," [Wave #2] ", and" [Wave #3] "."
(e.g., "There are no statistically significant differences between Waves 1, 2, and 3.")
(5) "There are no statistically significant trends in the data we have collected for this question over the" [pl wave label] "of this study."
(e.g. "There are no statistically significant trends in the data we have collected for this question over the Waves of this study.")
(6) "When looking at the" [Qlabel] ", we see no significant changes between" [Wave label] [Wave #1] "and" [Wave label] [Wave #2] "."
(e.g., "When looking at Age, we see no significant changes between Wave 1 and Wave 2.")

The following phrases do not require any text from the user lexicon.
(7) "When comparing waves of data for this question, we found no statistically significant differences."
(8) "Among the populations under study, no statistically significant trends emerged."
(9) "The responses to this question have remained fairly consistent from wave to wave."
(10) "These data do not demonstrate any trends with regard to this question."
(11) "These data do not indicate any statistically significant trends for this question."
(12) "These data do not indicate any trends across waves."

Statements for Statistically Significant Upward or Downward Trends from the Previous Wave, with Only Two Waves Under Consideration One of the following statements is randomly selected (unless otherwise specified) to translate the change into prose.

The program chooses a term for the DIRECTION VERB-CLAUSE, based on whether there was a statistically significant increase, or a statistically significant decrease from the first wave under consideration to the second wave under consideration.

If the difference was a statistically significant decrease, terms such as: dropped, fell significantly, or dropped significantly, are used.

If the difference was a statistically significant increase, terms such as: rose, jumped, grew significantly, increased significantly, and has increased significantly, are employed.

If there is no statistically significant difference, the program skips to the NO CHANGE terminology section of the lexicon, as described in the section above.
(13) "The proportion of" [umbrella pt] "who" [rp] [rc] [DIRECTION] "this" [Wave label] ", from" [W1%] "to" [W2%] "."
(e.g., "The proportion of Donors who gave $200 dropped this Wave, from 30% to 20%.")
(14) "The proportion of" [umbrella pt] "who" [rp] [rc] [DIRECTION] "from" [Wave label] [Wave #1] "(" [W1%]") to" [Wave label] [Wave #2] "("[W2%] [W2%] ")".
(e.g., "The proportion of Donors who gave $300 dropped from Wave 1 (30%) to Wave 2 (20%).")
(15) "Compared to the" [Wave label] [Wave #1] "study, a" [smaller] "proportion of" [bp] "in" [Wave label] [Wave #2] [rp] [Qlabel] ":" [rc] "."
(e.g., "Compared to the Wave 1 study, a smaller proportion of Donors in Wave 2 reached the following amount of Annual giving: $400.")
(16) "Compared with" [Wave label] [Wave #1] ", the trend is that" [banner point] [are more likely to] [rel. ph] [rc] "("[W1%]"in" [Wave label] [Wave #2] "vs." [W2%] "in" [Wave label] [Wave #1] ")."
(e.g., "Compared with Wave 1, the trend is that Donors are more likely to give 400 (25% in Wave 2 vs. 15% in Wave 1).)
(17) [Fewer] [Banner Point] "in" [Wave label] [Wave #2] "say they" [relationship phrase] [rc] "than said so in" [Wave label] [Wave #1]"."
(e.g., "Fewer Donors in Wave 2 say they did $500 or more than said so in Wave 1.")
(18) "The proportion of" [umbrella pt] "who" [rp] [rc] [DIRECTION] {"from" [W1%] "in" [Wave label] [Wave #1] "to" [W2%] "in" [Wave label] [Wave #2] "."}
(e.g., "The proportion of Donors who gave $200 dropped {from 30% in Wave 1 to 20% in Wave 2.}")

The second part of this sentence above, which is bracketed above by { } marks will be called D1, for directional time phrase #1, and will be referred to below.
(19) "A significant" [upward] "trend is visible regarding" [bp] "who" [rel. ph.] [rc] [D1.]
(e.g., "A significant upward trend is visible regarding Donors who gave $500 or more from . . . to . . . " etc.)

In statement (19) above, "downward" can be substituted for "upward" if a statistically significant decrease, rather than an increase, is found.

The following statement is used to report data for questions with a reduced base (i.e., if the n or sample size for the banner points is smaller than the quotas).
(20) "Among those who were asked this question, the proportion of" [bp] "who" [rp] [Qlabel] [rc mod] [rc] "rose significantly," [D1.]
(e.g., "Among those who were asked this question, the proportion of Donors who did Annual giving of 100 rose significantly, from . . . to . . . ," etc.)

The program uses the following phrases to follow-up a borrowed phrase from the current wave lexicon, when this wave is significantly lower than the first wave in the comparison.
(21) "This is a" [% change] [increase/decrease] "since" [wave label] [wave #1] "."
(e.g., "This is a 33% decrease since Wave 1.")

The program uses the following statement for scalar questions only.
(22) [More/Fewer] [(bp optional)] "give" [client] [rc mod] [rc] "on" [Qlabel] "("[W1%]"in" [Wave label] [Wave #1] "vs." [W2%] "in" [Wave label] [Wave #2] ")."

(e.g., "Fewer Non-Donors give ACME a 5 'excellent' on liking the "thank you gifts" (15% in Wave 1 vs. 5% in Wave 2).")

In this statement, award or assign may be substituted for give.

(23) [More/Fewer] [(bp optional)] [find] [Qlabel] [rc] [rc mod] [rc] "than in" [Wave label] [Wave #1] "."

(e.g., "Fewer Non-Donors find the "thank you gifts" rate a 5 'excellent' than in Wave 1.")

In the previous statement, 'to be' may be substituted for 'find.'

(24) [W2%] "give" [client] "a" [rc] "on" [Qlabel] "vs." [W1%] "in" [Wave label] [Wave #1] "."

(e.g., "20% give ACME a 2 'fair' on likable "thank you gifts" vs. 12% in Wave 1.")

In the previous statement, 'up from' or, if appropriate 'down from' may be substituted for 'vs.'.

The program uses the following statements for agree-disagree likeability scales only.

(25) "A growing proportion of" [bp][rc] "that they" [Qlabel] "from" [Client] "("[W1%]"in" [Wave label] [Wave #1] "vs." [W2%] "in" [Wave label] [Wave #2] ")."

(e.g., "A growing proportion of Non-Donors Strongly disagree that they like the "thank you gifts" from ACME (10% in Wave 1 vs. 20% in Wave 2).")

(26) "A greater proportion of" [bp] "in" [Wave label] [Wave #2] "than in" [Wave label] [Wave label #1] [rp] [Qlabel] [rc] "."

(e.g., "A greater proportion of Donors in Wave 2 than in Wave 1 gave an amount of $100.")

Statements for Comparing Three (3) or More Waves of Data

If the percentage of respondents giving a response category is not statistically significantly different from the previous wave, but there was a trend (trend being defined as constant, although not necessarily statistically significant, increases from one wave to another) up until the penultimate wave, then the one of the following statements is generated by the program.

This statement is used if the percentage difference between this wave and the last wave rounds to 1% and is not statistically significant.

(27) "The percentage of" [bp] "who" [rc] "plateaued this" [wave label] "."

(e.g., "The percentage of commuters who bike to work plateaued this year.")

This statement is used if the percent difference between this wave and the last rounds to 2% and is not statistically significant.

(28) "The proportion of" [bp] "who" [rc] "remained fairly constant. The change seen from" [last W %] "in the last" [wave label] "to" [current W %] "this" [wave label] "is not statistically significant."

(e.g., "The proportion of commuters who bike to work remained fairly constant. The change seen from 12% in the last wave to 14% this wave is not statistically significant.")

The following statement types exclude examples, as these should be obvious at this point from the foregoing.

If the proportion achieved this wave is the highest or lowest of any wave, then the following statements is used.

(29) "The proportion of" [bp] "who" [rc] "reached its" [highest/lowest] "level this wave."

Unless all the previous waves were lower and this is the only one statistically significantly higher than any of the others, statement (29) is followed by one of the following qualifying statements.

If this wave is only statistically higher than a wave other than the penultimate wave, this statement follows.

(29a) "Although not statistically significantly" [higher/lower/over/below] "the last" [wave label], "this" [wave label] "is statistically significant over" [wave label] [wave #statistically significantly higher than] "."

The next statement follows a statement with no statistically significant differences between the waves of data.

(29b) "However, this remains within the error bounds of previous waves of proportions."

If the only wave that this wave is higher than is the penultimate wave, then this statement is used.

(29c) "This is a statistically significant increase over" [wave label] [penultimate wave #] "."

If each wave has been higher than the previous wave, or each wave has been lower than its prior wave, and . . .

. . . each change was statistically significant and in the same direction, this statement is issued.

(29d) "This continues a strong trend of statistically significant" [increases/decreases] "in this measure in each wave of this study."

. . . not all the changes were statistically significant, then this statement follows.

(29e) "Although not statistically significant in each wave, this latest" [increase/decrease] "is the latest evidence of a consistent upward trend in this measure."

However, if a new category appears this wave which had no respondents in the previous waves, this statement is used instead of statement (29).

(30) "A new category appeared in this wave's results:" [rc] ", with" [current wave %] "of respondents reporting that category."

If all previous waves, but one, are within the margin of error of this wave, and thus not statistically significant, the following statement is generated by the program.

(31) "After" [dipping/rising] "in" [wave label] [statistically significantly different wave #] "to" [statistically significantly different W %] ",the proportion of respondents who are" [bp] "who answered" [rc] "to this question returned to its formerly" [higher/lower] "range with" [current wave %] "in" [wave label] [current wave #] "."

If changing from a lower level to a higher level and the last wave is not statistically significantly different vs. the lowest or highest wave, then the following statement is used.

(32a) "The jump in the proportion of" [bp] "respondents, choosing" [rc] "as their response, that occurred from" [wave label] [low % wave #] "("[low % wave # %]") to" [statistically higher % wave #] "("[statistically higher % wave # %] "), does not appear to have continued into the current wave (" [current wave %] ")."

If changing from a higher level to a lower level and the last wave is not statistically significantly different vs. the lowest or highest wave, then the following statement is used.

(32b) "The drop in the proportion of" [bp] "respondents, choosing" [rc] "as their response, that occurred from" [wave label] [high % wave #] "("[high % wave # %]") to" [statistically lower % wave #] "("[statistically lower % wave # %]"), does not appear to have continued into the current wave ("[current wave %]")."

If a continuous downward trend has occurred up to this wave and this wave is up, then the following statement is generated.

(33a) "This wave turned around what had been a downward trend among respondents choosing" [rc] "as their answer to this question."

If a continuous upward trend has occurred up to this wave and this wave is down, then the following statement is generated.

(33b) "This wave reversed what had been a upward trend among respondents choosing" [rc] "as their answer to this question."

If the last wave was higher than this wave and the last wave was statistically significantly higher than a previous wave and absolutely higher than in previous waves in turn, and this wave was as low as the second-to-last wave, then the program generates the following statement.

(34a) "The proportion of" [bp] "who" [rp] [rc] "fell back to ("[current wave %]") this wave."

If the last wave was lower than this wave and the last wave was statistically significantly lower than a previous wave and absolutely lower than in previous waves in turn, and this wave was as high as the second-to-last wave, then the program generates the following statement.

(34b) "The proportion of" [bp] "who" [rp] [rc] "bounced back to ("[current wave %]") this wave."

The way that the program generates the current wave findings ("This Wave's Findings") is illustrated by code module 9 in the code appendix.

The way that the program generates the "Sub-Group Differences of Note" text, uses the same methodology as the "Trends" text, but with different language, as outlined below.

For cases where the proportion under one banner point exceed the proportion reported under another paired banner point by a statistically significant margin, the program generates one of the two following statements:

(1) "Significantly more [higher bp] than [lower bp] reported [rc] as the answer to [Q#] ('[Qtext]')."
(2) [Higher bp] "("[higher bp %]") are more likely [rp] [rc] than" [lower bp] "("[lower bp %]")."

For cases where there are no differences between any subgroups, the text generated by the program is: "There were no statistically significant differences among the subgroups."

What is claimed is:

1. In a computer with at least memory, a method of storing market research survey data in a database and reporting from said database, said method comprising the following steps:
   (a) collecting input from a user with structured prompts for all the data needed for a questionnaire and tab plan and storing said data in said database, whereby errors of omission are reduced;
   (b) generating questionnaire and tab plan reports from said database, whereby reducing errors of inconsistency;
   (c) cleaning and data processing field collected data with computer scripts to assist analyst in tabulating data collected from said questionnaire using said tab plan; and
   (d) generating a detailed findings report from a combination of data stored in said database, cross tabulations of survey data in a spreadsheet, and user inputs, all processed by a program comprising the following steps:
      (i) collecting and storing in memory each summary statistic from each table within said cross tabulations together with data handles including questions, banner points and response categories that relate to said database;
      (ii) selecting at least one situation-appropriate sentence from a plurality of statements using rules based on the number of waves of data in the study;
      (iii) completing said statements with terms selected from the group consisting of user-input labels, summary statistics and directional verb clauses; and
      (iv) combining said prose sentences with other stored data to generate said detailed findings report.

2. The method of claim 1, with the further step that said data of step (a) must at least contain the following data elements:
   (a) the question label;
   (b) the question text;
   (c) indication as to whether or not the response categories to a question are to be read to respondents, not read to respondents, or read only if necessary;
   (d) indication as to whether or not to list the response categories in the order they appear, to randomize them, or to rotate the list;
   (e) indication as to whether not to have respondents indicate which response categories are applicable, or whether or not to have respondents rank response categories in order;
   (f) indication as to the number of response categories to be ranked or to be allowed to be selected from the entire list of response categories;
   (g) indication as to whether or not to allow answers other than those that appear on the list and how many such other answers to accept;
   (h) indication as to whether or not to include a no/none/nothing response category,
   (i) indication as to whether or not to include 'do not know' and 'refused' response categories in data summaries;
   (j) any instructions regarding which questions to ask which respondents or skip patterns associated with the response categories.

3. The method of claim 1 with the further step of automatically numbering questions and automatically updating skip patterns stored in said database, using question labels as reference points, whereby question renumbering need not be done manually after a change to said questionnaire of step (b).

4. The method of claim 1, wherein said computer scripts of step (c) comprise the following steps:
   (a) converting labels stored in said database of claim 1 into label syntax which can make a data tabulation program label stored data;
   (b) uniformly reassigning questions when questions are accidentally responded to as multiple response questions;
   (c) automatically determining break-points for banner point definitions;
   (d) method of lining up and comparing wave-to-wave data from a prior wave and a current wave of a tracking study.

* * * * *